No. 886,986.
PATENTED MAY 5, 1908.
E. W. KELSEY.
HAY PRESS.
APPLICATION FILED MAY 7, 1906.
2 SHEETS—SHEET 2.
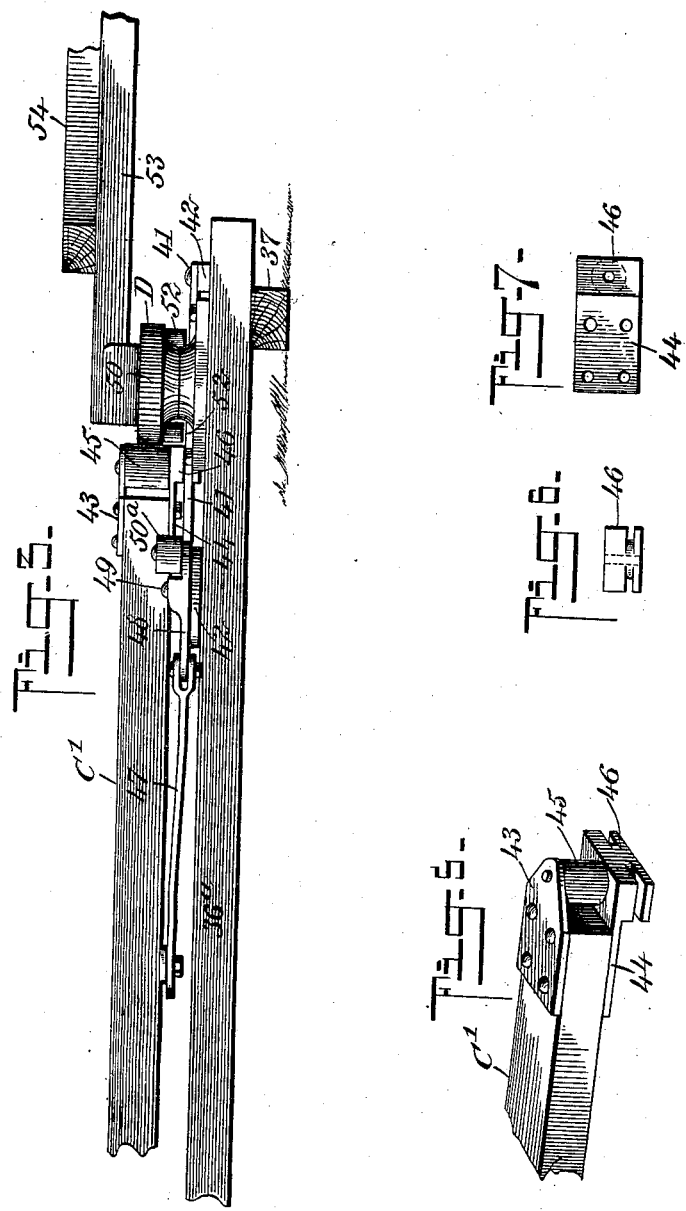
WITNESSES
INVENTOR
Eugene W. Kelsey
BY
ATTORNEYS

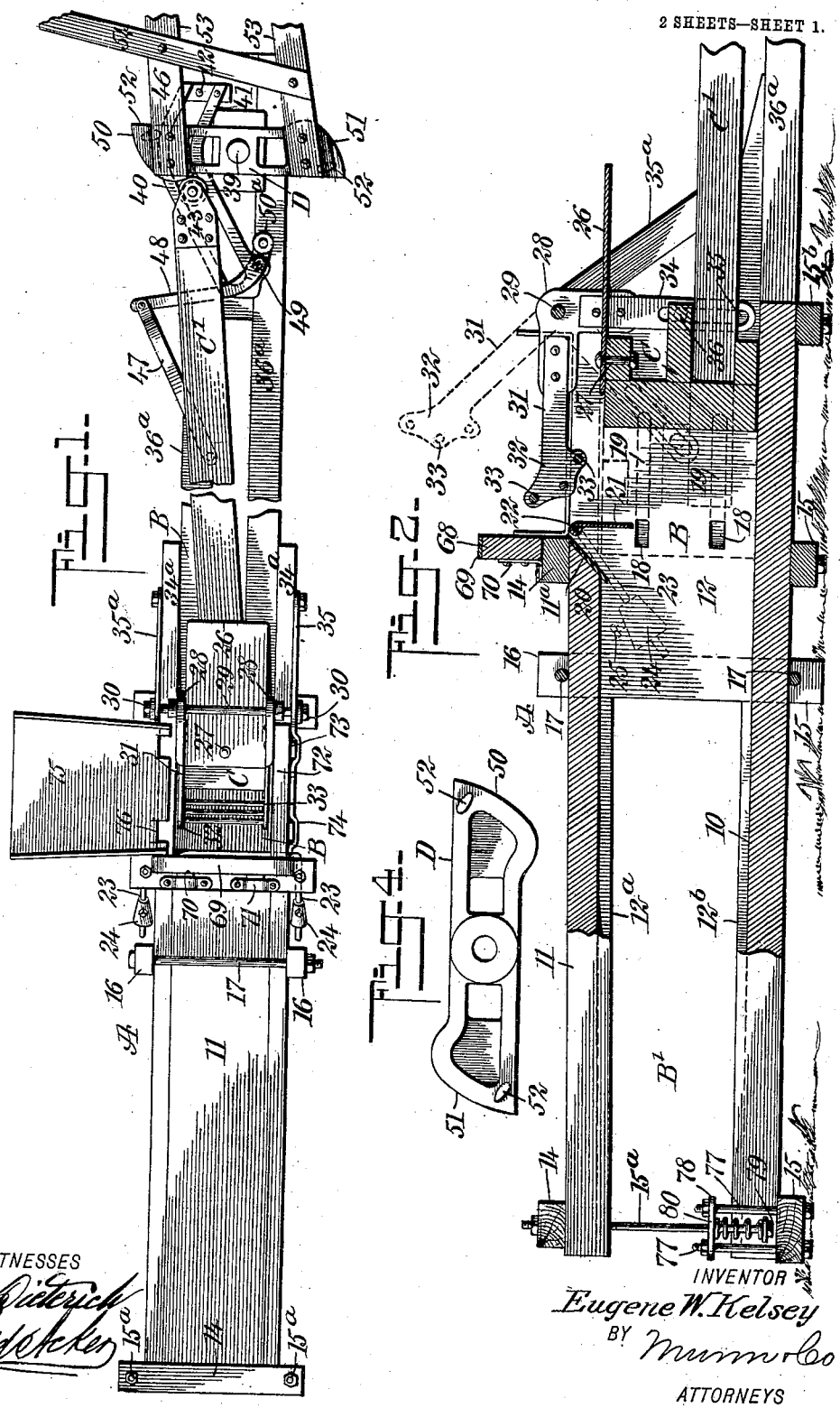

UNITED STATES PATENT OFFICE.

EUGENE W. KELSEY, OF COLLIERVILLE, TENNESSEE.

HAY-PRESS.

No. 886,986.  Specification of Letters Patent.  Patented May 5, 1908.

Application filed May 7, 1906. Serial No. 315,559.

*To all whom it may concern:*

Be it known that I, EUGENE W. KELSEY, a citizen of the United States, and a resident of Collierville, in the county of Shelby and State of Tennessee, have invented a new and Improved Hay-Press, of which the following is a full, clear, and exact description.

The purpose of the invention is to improve upon the construction of hay press for which Letters Patent were granted to me July 3, 1906, No. 825,132, which improvements consist in providing simplified and more direct acting means for operating the plunger shaft from a cam or projection extending downward from the under side of a main cam, said projection being in such a position as to act upon the short arm of a lever, the long arm of said lever being attached to a plunger shaft, so that as soon as the plunger shaft is released from the main cam the said plunger returns to its normal or outer position after having completed its initial or rearward stroke.

Another improvement consists in the manner in which the tension springs at the rear of the bale-receiving compartment are applied, and in providing the baling chamber with an automatically operated feeder and folder, which latter prevents the hay from returning into the baling chamber after it has been forced in the form of a bale into the rear or receiving compartment of the press.

A further improvement consists in providing an apron carried by a plunger which closes the baling compartment or chamber while the plunger is at the inner end of its stroke, receiving hay which is fed to the baling chamber until the above-mentioned lever returns the plunger to its normal or outward position, the feeder then forcing the hay into the chamber.

Another improvement consists in providing a hopper for the baling chamber, which can be employed to feed material thereto from either side of the said chamber.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a plan view of the improved press; Fig. 2 is a longitudinal vertical section through the body portion of the press drawn upon an enlarged scale; Fig. 3 is a side elevation of the outer end of the plunger shaft, an edge view of the cam or lever acting thereon, and parts connected with the plunger shaft and the cam or lever. Fig. 4 is a bottom plan view of the cam or lever; Fig. 5 is a detail perspective view of the end of the plunger shaft and cross head; Fig. 6 is a detail end view of the cross head; and Fig. 7 is a bottom plan view of the same.

A represents the body of the press. In the construction of this body a bottom 10 is employed and a top 11 that extends to the back but stops short at the front, and its forward end $11^a$ is given a rearward or downward bevel or inclination as is clearly shown in Fig. 2, so that the front portion of the body is open at the top. Side pieces 12 are secured to the top and bottom at the front open portion of said body, forming thereby a baling chamber B, open at the front as well as at the top; and the said side pieces 12 extend rearward beyond the forward end of the top 11 as is clearly shown in Figs. 1 and 2.

Flanged side pieces $12^a$ extend down from the top 11 at the rear of the side pieces 12, and correspondingly flanged side pieces $12^b$ extend up from the side portions of the bottom 10 as is shown in Fig. 2; otherwise the rear portion of the body is open, and said rear portion back of the baling chamber B constitutes a bale-receiving chamber B', being left open for the purpose of applying the bale ties. The body is braced and strengthened by cross pieces 14 located at the top, one at the rear end and the other at the inner end $11^a$ of the top section, and corresponding sills 15 are located transversely of the bottom 10 of the body of the press. The cross bars 14 and sills 15 are connected by side rods $15^a$ in any suitable or approved manner. The forward end of the body, which is the receiving end of the baling chamber B, is likewise strengthened by a sill $15^b$ bolted to the bottom 10, or otherwise securely fastened thereto. The body A of the press is usually further strengthened between the baling chamber and its rear or delivery end by side beams 16, which extend beyond the top and bottom sections 11 and 10, being connected by rods 17, which pass one rod over the top section 11 and the other rod below the lower or bottom section 10 as is illustrated in Figs. 1 and 2.

A series of apertures 18 is made in the sides 12 of the baling chamber B adjacent to the rear open portion of said chamber as is shown in Fig. 2; and as is indicated by dotted lines in the same figure, keeper springs 19 are secured at one of their ends to the outside of the side pieces 12 adjacent to each slot or aperture 18, the heads of which springs are made to extend into the baling chamber through the slots 18 in the customary manner, but prevent the material in the baling chamber from working backward after it has been forced into the receiving chamber B', assisted in such action by a folder to be hereinafter described.

The folder for the press consists of two metal leaves 20 and 21. The leaf 20 is secured firmly to the inclined forward edge 11$^a$ of the upper section 11 of the press, and extends down a slight distance into the baling chamber B. The other leaf 21 is located in front of the fixed leaf 20, and at times is adapted to be carried rearward to an engagement with said fixed leaf. The leaf 21 is secured to a shaft 22 mounted in suitable bearings at the upper rear portion of the baling chamber B, as shown in Fig. 2, and a crank arm 23 is provided at each end of the shaft 22 outside of the baling chamber B. A weight 24 is adjustably secured to each crank arm 23 by means of a set screw 25 or its equivalent. These weighted crank arms 23 serve to normally hold the leaf 21 separated from the fixed leaf 20 and in a vertical position within the baling chamber as is shown in Fig. 2.

When the plunger C, which has sliding movement in the baling chamber B is carried rearward to force the contents of the baling chamber into the receiving chamber B', the said plunger forces the hinged and weighted leaf 21 of the folder up against the fixed leaf 20, permitting the plunger to force the material from the baling chamber; but as the plunger C returns the weighted leaf 21 automatically drops to its vertical position, preventing the return of material into the said baling chamber.

The rear end portion of an apron 26 is located upon the top of the plunger C, being attached thereto about centrally between its sides by a pivot pin 27, in order that the said apron 26 shall not bind in the baling chamber B as the plunger is moved backward and forward. This apron closes the top of the baling chamber when the plunger C is at the rear end portion of said chamber, and should any material be fed at such time to the baling chamber it will be received upon the apron, from whence it can be readily removed as the plunger C is on its return stroke.

In connection with the baling chamber B I employ a feeding device. This feeding device consists of opposing angular castings 28, which are mounted to turn at the junction of their members upon a shaft 29 extending across the upper forward portion of the baling chamber B as shown in Figs. 1 and 2, the said shaft being provided with suitable nuts 30 at its outer ends. An arm 31 is secured to the upper member of each casting 28, and the said arms 31 are in parallelism with the parts of the casing to which they are secured. At the rear end of each arm 31 an enlargement or head 32 is provided, which occupies a position more or less at an angle to the arms 31 as is shown in Fig. 2; and rods 33 are made to connect the heads 32, the said rods and heads being adapted as the plunger is carried outward from the baling chamber, to be dropped downward and press the loose material into the baling chamber, which action is accomplished by attaching other sections 34 to the lower or vertical members of the castings 28, and in these lower members 34 slots 35 are produced, which slots loosely receive pins 36, extending from the sides of the plunger C; and when the plunger C is at its innermost position the upper or pressing portion of the said plunger will have the upper inclined position out from the baling chamber as is shown by dotted lines in Fig. 2.

Forward extensions 34$^a$ in the form of side sills are provided for the lower front portions of the sides 12 of the baling chamber B. These extension sills 34$^a$ are each attached to a beam 36$^a$. These beams extend in parallelism forwardly from the baling chamber as far as may be required, resting upon a transverse sill 37. A pivot 39 is made integral with the base 38 about midway between its sides as is shown in Fig. 1, and concentric curved guide rails 40 and 41 are curved around the post 39 at one side thereof and are removed a required distance therefrom, and these guide rails are supported at an elevation above the beams 36$^a$ or in any suitable manner by underlying cross bars or plates 42.

A shaft C' is secured at its inner end in any approved manner to the plunger C, and this plunger shaft C' is sufficiently long to extend over the guide rails 40 and 41. An upper strap 43 is secured to the outer or forward end of the plunger shaft C', and a strap 44 is secured to the under face of the said plunger shaft, and this strap has a cross head 46 formed on its under side as shown in Fig. 5, the lower portion whereof passes between the guide rails 40 and 41, being circular in order to prevent binding; and between the outer ends of said straps a roller 45 is mounted to loosely turn. The cross head 46 serves to guide the forward or outer end of the plunger shaft as the plunger moves forward and backward in the baling chamber B.

Under the form of construction shown in Figs. 1 and 3, a link 47 is pivoted to the under face of the plunger shaft C' at for example its right-hand side, the link 47 extending forward and outward beyond said side, as clearly illustrated in Fig. 1; and the forward end of the link 47 is pivotally attached to a lever arm 48 which extends beneath the

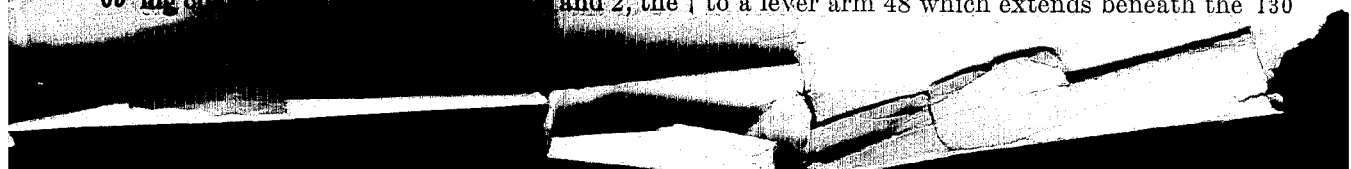

plunger shaft C' to the opposite side of the guide rails 40 and 41, and its unattached end is more or less forwardly curved and is fulcrumed by a suitable pin 49 preferably upon the inner or rear end portion of the connected guide rails as is shown in Fig. 1. Forward of the pivotal portion of the said lever arm 48 a roller $50^a$ is mounted to revolve, extending upward from the lever arm as best shown in Fig. 3.

In connection with the plunger shaft C' an operating lever or cam D is employed. This cam or operating lever is mounted at its central portion to turn loosely around the pivot 39, and the said cam or operating lever D is provided at its ends with cam surfaces designated respectively 50 and 51, which cam surfaces are more or less semi-elliptical and face in opposite directions, and when the lever arm 48 is employed for the purpose of returning the plunger shaft C' to its outer or normal position, cams 52 are projected downward from opposite diagonal corners of the said operating lever D, as shown particularly in Fig. 4, the said lugs being near the ends of the cam and a little forward of the extreme end of the cam with relation to its movement.

Draft arms 53 are secured to the operating lever D at opposite sides of its center, adapted to carry a swingletree for example at its outer ends, and a diagonal hitching bar 54 is secured to the draft arms 53 and extend beyond that side of the arm at which the draft device or swingletree is located, the hitching arm being adapted for the customary purpose of connecting the forward portion of the harness of the draft animal thereto.

In the operation of this form of the device, as the operating lever D is revolved and a cam surface 50 or 51 is brought in contact with the roller 45 at the outer end of the plunger shaft C', the said shaft is forced rearward, and consequently the plunger C is made to travel on its rear or compressing stroke in the baling chamber. As soon as the cam surfaces 50 or 51 has forced the plunger C as far rearward as necessary and disengages from the roller 45 on the plunger shaft C', a cam 52 adjacent to the particular cam surface engaged, will be brought into engagement with the roller $50^a$ on the lever arm 48 and will force its roller bearing end rearward, thus carrying its opposite end forward and causing the plunger shaft C' and its attached plunger C to be drawn out the limit of the return stroke.

At the rear of the upper opening of the baling chamber B, a guard rail or block 68 is secured upon the cross beam or bar 14, as is shown in Fig. 2, and this guard block 68 is provided with a strap 69 on its upper face, which strap extends down along each end of said block yet is spaced from said ends, and the guard block or rail 68 is made removable by attaching brackets 70 thereto and passing the said brackets through loops 71 secured upon the upper face of the said cross bar 14, as is shown in Figs. 1 and 2.

A single side guard rail 72 is employed, which may be placed in position at either side of the baling chamber; and one end of the side rail 72, when said rail is in position, is made to enter the space between the projecting end of the strap 69 and the opposing end surface of the rear rail 68. The side rail 72 is provided with vertical brackets 73, which extend beyond its lower edge, and when the side rail 72 is in position enter keepers 74 secured to both outer side faces of the baling chamber B; and at the open side of the baling chamber, or that which is unprotected by the guard rail 72 a feed trough 75 is located, having lugs 76 extending downward therefrom and corresponding to the brackets 73 of the guard rail 72, and the lugs of the feed trough are passed down into the keepers 74 at the side of the baling chamber B adjacent to which the feed trough is placed.

Braces $35^a$ are carried from the extensions $34^a$ of the baling chamber B up to the shaft 29 at the upper forward end of said chamber, as is shown in Fig. 1. The rear end of the receiving chamber B' is tension controlled, and the rods $15^a$ connecting the lower rear sill 15 with the upper cross bar 14 are secured to the cross bar but do not extend into the sill, since at each end of the sill parallel upright rods 77 are secured, connected at top by a plate 78. The rods $15^a$ extend loosely through the plates 78 and are provided with heads 79 at their lower ends, and springs 80 are coiled around the said rods between their heads 77 and the guide plate 78, which springs have a tendency to draw the rear end portion of the upper section 11 of the baling press downward so as to exert more or less downward pressure on the finished bale as it leaves the press.

Having thus described my invention, I claim as new, and desire to secure by Letters Patent:—

1. In a hay press, a baling chamber, a plunger for the same, a shaft secured to said plunger, a roller at the end of the shaft, fixed parallel and substantially elliptical guide rails, a cross head, at the roller end of the shaft having a cylindrical central portion adapted to operate between said elliptical guide rails, an operating lever fulcrumed at its center adjacent the said guide rails, the said rails being eccentric to the pivot of said lever, which lever is provided with oppositely facing semi-elliptical end cam surfaces that alternately engage with the shaft roller, and auxiliary cam extensions from the under face of the operating lever adjacent its end cam surfaces, a return lever fulcrumed adjacent an inner end of said guide rails, a link connection between the return lever and said shaft, and a roller at the pivoted end of the return lever for engagement with the said auxiliary cams of the operating lever, the said operating lever in its rotation acting first upon the plunger shaft to force the plunger inward in the baling chamber, and next upon the return lever to return the plunger to the mouth of the said baling chamber.

2. In a hay press, the combination with the upper rear wall of the baling chamber and a leaf fixed to said wall at the mouth of the said chamber, which leaf has a downward and rearward inclination extending at its lower end within said chamber, of a shaft pivoted in front of the fixed leaf, a second leaf secured to said shaft, which leaf extends within the path of the plunger of the press, a crank arm located at an end of the shaft outside of the baling chamber, and a weight adjustably mounted upon said shaft.

3. In combination with the body, its baling chamber, and a plunger held to slide in the baling chamber, of L-shaped arms, pivoted at the junction of their members at the sides of the baling chamber adjacent its forward end, each arm comprising a short member extending downward within said chamber, and a longer member extending over the chamber, the longer member of the arms having their rear ends enlarged to extend above and below the upper and lower edges of the main portions of said members, the said enlargements being given a downward and forward inclination at their rear edges, rods fixed one above the other in the enlargements of the arms and pins extending from the plunger into slots produced in the shorter members of said arms.

In testimony whereof I have signed my name to this specification in the presence of two subscribing witnesses.

EUGENE W. KELSEY.

Witnesses:
T. H. CANON,
J. W. KELSEY.